US012801478B2

(12) United States Patent
Kwon et al.

(10) Patent No.: US 12,801,478 B2
(45) Date of Patent: Nov. 17, 2026

(54) METHOD FOR VALIDATING MEASUREMENT/METERING INFORMATION FOR PACKET FILTERING BASED ON DEEP PACKET INSPECTION AND DISTRIBUTED ENERGY RESOURCE GATEWAY USING THE SAME

(71) Applicant: KOREA ELECTRIC POWER CORPORATION, Naju-si (KR)

(72) Inventors: Yoo-Jin Kwon, Daejeon (KR); No-Gil Myoung, Daejeon (KR); Chung-Hyo Kim, Daejeon (KR); Jong-Min Jo, Daejeon (KR); Min-Ha Park, Daejeon (KR)

(73) Assignee: KOREA ELECTRIC POWER CORPORATION, Naju-si (KR)

( * ) Notice: Subject to any disclaimer, the term of this patent is extended or adjusted under 35 U.S.C. 154(b) by 356 days.

(21) Appl. No.: 18/715,211

(22) PCT Filed: Apr. 30, 2024

(86) PCT No.: PCT/KR2024/005886
§ 371 (c)(1),
(2) Date: May 31, 2024

(87) PCT Pub. No.: WO2024/232590
PCT Pub. Date: Nov. 14, 2024

(65) Prior Publication Data
US 2026/0154145 A1 Jun. 4, 2026

(30) Foreign Application Priority Data
May 8, 2023 (KR) ........................ 10-2023-0059139

(51) Int. Cl.
*G06F 11/07* (2006.01)

(52) U.S. Cl.
CPC ........ *G06F 11/079* (2013.01); *G06F 11/0736* (2013.01)

(58) Field of Classification Search
None
See application file for complete search history.

(56) References Cited

U.S. PATENT DOCUMENTS 9,930,057 B2 * 3/2018 Di Pietro ............ H04L 63/1425
11,171,975 B2 * 11/2021 Vasseur .................. G06N 20/00
(Continued)

FOREIGN PATENT DOCUMENTS

JP 2012-222572 A 11/2012
KR 10-2018-0037199 A 4/2018
KR 10-1889502 B1 8/2018

*Primary Examiner* — Fekadeselassie Girma
(74) *Attorney, Agent, or Firm* — Benest Law Office PC

(57) ABSTRACT

A method for verifying validity of measurement/metering information for DPI-based packet filtering and the distributed energy resource gateway utilizing the method are provided. The measurement/metering information validity verification method includes collecting first measurement/metering information from a smart meter and second measurement/metering information from a smart inverter, calculating the error between the first measurement/metering information and the second measurement/metering information based on the first measurement/metering information, determining whether the error falls within a maximum possible error range, and performing deep packet inspection (DPI) functionality according to the determination result.

14 Claims, 7 Drawing Sheets

(56) References Cited

U.S. PATENT DOCUMENTS

| | | | | |
|---|---|---|---|---|
| 11,240,130 | B2 * | 2/2022 | Pazhyannur | H04L 43/04 |
| 11,275,643 | B2 * | 3/2022 | McCann | G06F 11/0793 |
| 2010/0250497 | A1 * | 9/2010 | Redlich | G06Q 10/06<br>707/661 |
| 2015/0016249 | A1 * | 1/2015 | Mukundan | H04L 12/66<br>370/230 |
| 2017/0126516 | A1 * | 5/2017 | Tiagi | H04L 43/08 |
| 2018/0048550 | A1 * | 2/2018 | Beyah | H04L 43/065 |
| 2020/0036748 | A1 * | 1/2020 | Tebekaemi | H02J 13/12 |
| 2020/0389469 | A1 * | 12/2020 | Litichever | H04L 12/18 |
| 2021/0157312 | A1 * | 5/2021 | Cella | G01M 13/028 |

* cited by examiner

METHOD FOR VALIDATING MEASUREMENT/METERING INFORMATION FOR PACKET FILTERING BASED ON DEEP PACKET INSPECTION AND DISTRIBUTED ENERGY RESOURCE GATEWAY USING THE SAME

CROSS-REFERENCE TO RELATED APPLICATIONS

This application claims the benefit under 35 U.S.C. Section 371, of PCT International Application No. PCT/KR2024/005886, filed on Apr. 30, 2024, which claimed priority to Korean Patent Application No. 10-2023-0059139, filed on May 8, 2023, in the Korean Intellectual Property Office, both of which are hereby incorporated by reference in their entireties.--

TECHNICAL FIELD

The present invention relates to a measurement/metering information validity verification method for Deep Packet Inspection (DPI)-based packet filtering and a distributed energy resource gateway using the same, and more particularly, a method for verifying the validity of measurement/metering information collected from smart inverters to secure DPI-based packet filtering operation, thereby enhancing the intrinsic security stability and reliability of the smart inverters in a distributed energy resource gateway.

Furthermore, the present invention claims the benefits of Korean Patent Application No. 10-2023-0059139 filed on May 8, 2023, and the entire contents thereof are incorporated herein by reference.

BACKGROUND ART

Distributed power systems, particularly those utilizing renewable energy sources, are connected to the power grid through inverters as power conversion devices. However, due to the nature of renewable energy relying on sunlight or wind, power production can vary significantly depending on the weather conditions, disrupt the power grid's stability, impacting voltage, frequency, and other critical parameters. In contrast to traditional inverters, which could only passively disconnect all installations from the grid in response to sudden voltage drops, smart inverters actively respond to the intermittency and variability of distributed generation through grid connection capabilities, thereby enhancing power quality and reinforcing stability and resilience. In other words, smart inverters stand as intelligent power conversion devices equipped to actively respond to grid crises such as voltage and frequency fluctuations, guided by predefined functions.

However, for customer-owned and installed smart inverters, power companies lack the authority to enforce security requirements. This situation may result in smart inverters currently lacking robust security measures implemented in their hardware or software.

FIG. 1 is a diagram illustrating the security vulnerability of smart inverters. FIG. 1 illustrates the widely used power control protocols, Modbus and distributed network protocol (DNP), undergoing deep packet inspection (DPI) analysis by next-generation firewall and web application firewall (WAF) devices for enhanced security.

However, hackers on the public internet can exploit internet-connected smart inverters to gain control of their firmware or obtain root privileges on the operating system, allowing them to launch attacks, such as falsifying measurement and billing data or injecting backdoors into smart inverters supply chain attack.

Since customer-premises smart inverters lack inherent security and reliability, verifying the authenticity and validity of measurement/metering information packets generated by smart inverters using DPI algorithms is crucial before feeding them into the renewable energy control network.

In relation to this, Korean Registered Patent No. 1,889,502 has proposed a solution. Korean Registered Patent No. 1,889,502 discloses a technique for detecting abnormal traffic on control system protocols, which focuses on analyzing the field structure of Application Protocol Data Units (APDU) in the application layer packet structure, i.e., DPI functionality from a format inspection perspective. However, Korean Registered Patent No. 1,889,502 faces the limitation of being difficult to thoroughly analyze packet content, as it is challenging to identify cases and operational scenarios applied in the power domain and field.

Therefore, there is a need to develop measures to initially verify the authenticity of the measurement/metering information generated by smart inverters.

DISCLOSURE

Technical Problem

The present invention relates to a measurement/metering information validity verification method for DPI-based packet filtering and a distributed energy resource gateway using the same, capable of verifying the validity of measurement/metering information collected from smart inverters to secure DPI-based packet filtering operation, thereby enhancing the intrinsic security stability and reliability of the smart inverters in a distributed energy resource gateway.

Technical Solution

According to an embodiment of the present invention, a measurement/metering information validity verification method may include collecting first measurement/metering information from a smart meter and second measurement/metering information from a smart inverter, calculating the error between the first measurement/metering information and the second measurement/metering information based on the first measurement/metering information, determining whether the error falls within a maximum possible error range, and performing deep packet inspection (DPI) functionality according to the determination result.

The method may further include calculating, before the collecting, the maximum possible error range using the measurement accuracy of the smart meter and the measurement accuracy of the smart inverter.

The performing of DPI functionality may include executing the DPI functionality based on the calculated error falling within the maximum possible error range and suspending the DPI functionality based on the calculated error falling out of the maximum possible error range.

The collecting may include calculating, when there are multiple smart inverters, the sum of the second measurement/metering information.

According to another embodiment of the present invention, a method for verifying validity of measurement/metering information for DPI-based packet filtering may include collecting first and second measurement/metering information included in measurement/metering items from a smart inverter, calculating third measurement/metering information corresponding to the second measurement/metering information using the first measurement/metering information, comparing the second measurement/metering information and the third measurement/metering information, determining whether the error falls within a maximum possible error range, and performing deep packet inspection (DPI) functionality based on the determination result.

The first measurement/metering information may be phase-specific measurement/metering value, and the second measurement/metering information and the third measurement/metering information may be three-phase average measurement/metering values.

The first measurement/metering information may include current, voltage, and power factor, and the second measurement/metering information and the third measurement/metering information may include active power quantity, reactive power quantity, and apparent power quantity.

According to another embodiment of the present invention, a method for verifying validity of measurement/metering information for DPI-based packet filtering may include generating first measurement/metering information using an internally embedded metering Integrated circuit (IC), collecting second measurement/metering information from a smart inverter, calculating the error between the first measurement/metering information and the second measurement/metering information based on the first measurement/metering information, and determining whether the calculated error falls within the maximum possible error range, and performing DPI (Deep Packet Inspection) functionality according to the determination result.

The metering IC may incorporates an analog circuit of a current transformer (CT)/potential transformer (PT) serving as a current and voltage sensor.

According to another embodiment of the present invention, a distributed energy resource gateway (DER GW) may include at least one processor and a memory configured to store computer-readable instructions, wherein the instructions may be executed by the at least one processor for the distributed energy resource gateway to collect first measurement/metering information from a smart meter or embedded metering integrated circuit (IC) and second measurement/metering information from a smart inverter, calculate the error between the first measurement/metering information and the second measurement/metering information based on the first measurement/metering information, determine whether the calculated error falls within a maximum possible error range, and perform deep packet inspection (DPI) functionality according to the determination result.

The instructions may be executed by the at least one processor for the distributed energy resource gateway to calculate, before collecting the first measurement/metering information and the second measurement/metering information, the maximum possible error range using the measurement accuracy of the smart meter and the measurement accuracy of the smart inverter.

The instructions may be executed by the at least one processor for the distributed energy resource gateway to execute the DPI functionality based on the calculated error falling within the maximum possible error range and suspend the DPI functionality based on the calculated error falling out of the maximum possible error range.

The instructions may be executed by the at least one processor for the distributed energy resource gateway to calculate, when there are multiple smart inverters, the sum of the second measurement/metering information.

According to another embodiment of the present invention, a distributed energy resource gateway may include at least one process and a memory configured to store computer-readable instructions, wherein the instructions are executed by the at least one processor for distributed energy resource gateway to collect first and second measurement/metering information included in measurement/metering items from the smart inverter, calculate third measurement/metering information corresponding to the second measurement/metering information using the first measurement/metering information, compare the second measurement/metering information and the third measurement/metering information, determine whether the error falls within a maximum possible error range, and perform deep packet inspection (DPI) functionality based on the determination result.

According to another embodiment of the present invention, a distributed energy resource gateway may include at least one process and a memory configured to computer-readable instructions, wherein the instructions are executed by the at least one processor for the distributed energy resource gateway to generate first measurement/metering information using an embedded metering integrated (IC), collect second measurement/metering information from a smart inverter, calculate an error between the first and second measurement/metering information based on the first measurement/metering information, determine whether the calculated error falls within the maximum possible error range, and perform deep packet inspection (DPI) functionality based on the determination result.

According to another embodiment of the present invention, a distributed energy resource gateway may include a packet structure analysis unit configured to analyze a packet format of the measurement/metering information collected by the smart inverter, a measurement/metering information validity verification unit configured to verifying validity of the measurement/metering information, and a simple ruleset definition and filtering unit and a correlation ruleset definition and filtering unit configured to analyze correlation between transmitted and received packets for validity verification of DPI-based packet filtering, wherein the measurement/metering information validity verification unit may perform one of a method of verifying the validity of the measurement/metering information collected from the smart inverter using the smart meter installed near the smart inverter, a method of verifying the validity of the measurement/metering information collected from the smart inverter by analyzing and comparing various measurement items of the smart inverter, and a method of verifying the validity of the measurement/metering information collected from the smart inverter by internally generating measurement/metering information using the metering IC and comparing the generated information with the measurement/metering information collected from the smart inverter.

Advantageous Effects

The present invention is advantageous in terms of providing intrinsic security stability and reliability for smart inverters by verifying the validity of measurement/metering information collected from smart inverters to ensure the operation of DPI-based packet filtering.

The present invention is also advantageous in terms of verifying the validity of measurement/metering information collected from smart inverters using smart meters installed near the smart inverters for AMI purposes.

The present invention is also advantageous in terms of verifying the validity of measurement/metering information collected from smart inverters by analyzing and comparing various measurement items collected from the smart inverters.

The present invention is also advantageous in terms of verifying the validity of measurement/metering information collected from smart inverters by embedding a low-cost metering integrated circuit (IC) for Internet of Things (IoT) sensors in the distributed energy resource gateway (DER GW), generating its own measurement/metering information, and comparing the generated information with the measurement/metering information acquired from the smart inverter.

MODE FOR INVENTION

Figure 1:
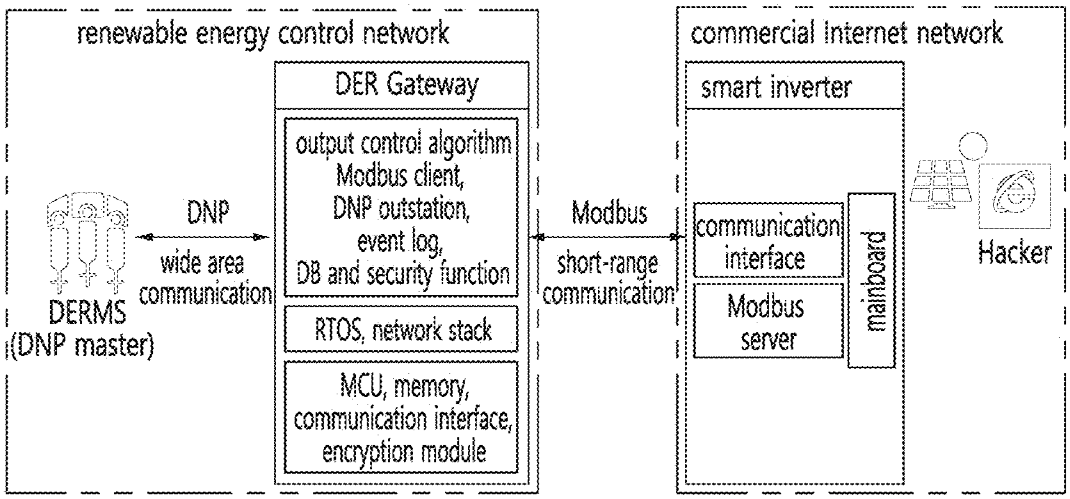
FIG. 1 is a diagram illustrating the security vulnerability of smart inverters.

Hereinafter, preferred embodiments of the present invention are described with reference to accompanying drawings. However, detailed descriptions of well-known functions or configurations will be omitted to avoid obscuring the subject matter of the present invention. It should be noted that the same reference numerals refer to the same components throughout the drawings.

The terms and words used in the following specification and claims should be interpreted not in a limited sense to their usual or dictionary meanings but in meanings and concepts that conform to the technical ideas of the present invention, based on the principle that the inventor can appropriately define the terms to best describe their invention.

Therefore, the embodiments described in this specification and configurations depicted in the drawings represent only the preferred embodiments of the present invention and do not fully embody all the technical ideas of the present invention, so it should be understood at the time of this application that there may be various equivalent elements and alternative embodiments that can replace them.

In the attached drawings, certain components may be exaggerated, omitted, or depicted schematically, and the sizes of individual components may not be proportional to their actual sizes. The present invention is not limited by the relative sizes or spacing shown in the attached drawings.

Also, when a part is said to "comprise" a certain component, this means that other components may be further included instead of excluding other components unless specifically stated otherwise. Additionally, when one part is "connected" to another part, it includes not only being "directly connected" but also being "electrically connected" through intermediate components.

As used herein, the singular forms are intended to include the plural forms as well, unless the context clearly indicates otherwise. The terms "comprising" or "having" indicate the presence of the features, numbers, steps, operations, components, parts, or combinations thereof as listed in the specification, without excluding the presence or possibility of one or more other features, numbers, steps, operations, components, parts, or combinations thereof.

In addition, the term "module" used in the specification means a software or hardware component such as a Field Programmable Gate Array (FPGA) or Application Specific Integrated chip (ASIC), which performs certain tasks. However, the term "module" is not limited to software or hardware. A "module" may be configured to reside on addressable storage media and may be configured to execute one or more processors. Therefore, for example, a "module" encompass components such as software components, object-oriented software components, class components, and task components, as well as processes, functions, attributes, procedures, subroutines, segments of program code, drivers, firmware, microcode, circuits, data, databases, data structures, tables, arrays, and variables. The functionalities of the components and modules may be combined into fewer components and modules or further separated into more components and modules.

The embodiments of the present invention will be described in detail hereinafter with reference to the accompanying drawings to facilitate implementation by those skilled in the art within the relevant technical field. However, the present invention can be embodied in various forms, and is not limited to the embodiments described herein. In order to clearly describe the present invention, parts irrelevant to the description may be omitted in the drawings, and similar reference numerals may be used for similar components throughout the specification.

Hereinafter, preferred embodiments of the present invention are described with reference to the accompanying drawings.

Figure 2:
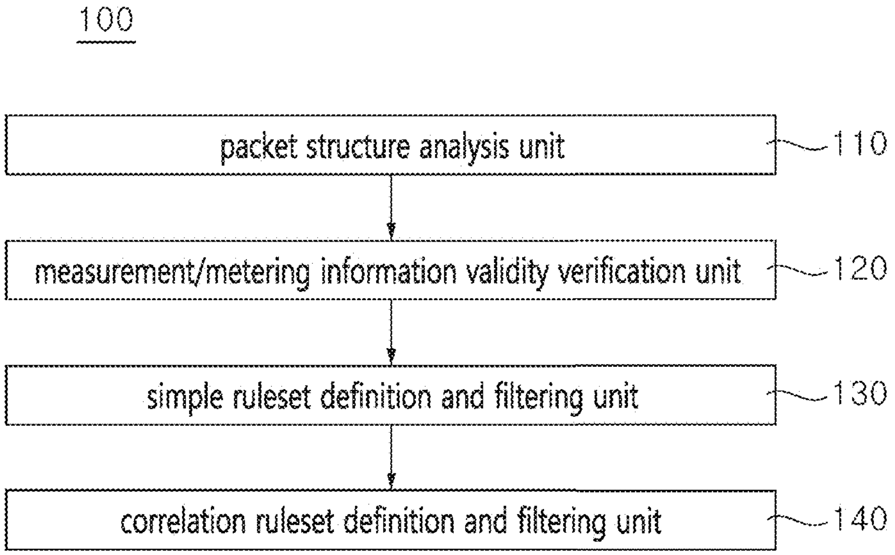
(Prior Art) FIG. 2
FIG. 2 is a diagram illustrating a distributed energy resource gateway utilizing the measurement/metering information validity verification method for DPI-based packet filtering according to an embodiment of the present invention.

FIG. 2 is a diagram illustrating a distributed energy resource gateway utilizing the measurement/metering information validity verification method for DPI-based packet filtering according to an embodiment of the present invention.

As shown in FIG. 2, the distributed energy resource gateway 100 (hereinafter 'DER GW') utilizing the method for verifying the validity of measurement/metering information for DPI-based packet filtering according to an embodiment of the present invention prioritizes validating the packet validity of metering/measurement information obtained from a smart inverter and fed into the power control network in accordance with the interconnection between the commercial Internet network and the power control network.

Specifically, the DER GW 100 includes a packet structure analysis unit 110, a measurement/metering information validity verification unit 120, a simple rule set definition and filtering unit 130, and a correlation ruleset definition and filtering unit 140.

The packet structure analysis unit 110 first analyzes the packet format of the measurement/metering information acquired by the smart inverter, specifically examining the field structure of the Application Protocol Data Unit (APDU) in the application layer packets, while the simple ruleset definition and filtering unit 130 and the correlation ruleset definition and filtering unit 140 analyze the correlation between transmitted and received packets. A detailed explanation of this is omitted as it can be readily understood through existing DPI-based packet filtering algorithms.

Next, the measurement/metering information validity verification unit 120 installed between the packet structure analysis unit 110 and the simple ruleset definition and filtering unit 130 verifies the validity of the measurement/metering information acquired by the smart inverter. This may provide a preprocessing function for DPI-based packet filtering algorithms for analyzing correlations between transmitted/received packets.

For this purpose, the measurement/metering information validity verification unit 120 may employ the following three approaches. The first approach involves utilizing smart meters installed near the smart inverter for AMI purposes. The second approach involves analyzing and comparing various measurement items collected from the smart inverter. The third approach involves embedding a low-cost metering IC designed for IoT sensors in the DER GW to generate measurement/metering information autonomously and compare the generated information with the measurement/metering information acquired from the smart inverter.

Hereinafter, detailed descriptions are made of the three approaches for performing measurement/metering information validity verification in the measurement/metering information validity verification unit 120 of the DER GW 100.

1. Smart Inverter Measurement/Metering Information Validity Verification Using Smart Meter FIG. 3 is a diagram illustrating the verification of the validity of measurement/metering information of a smart inverter using a smart meter.

Figure 3:
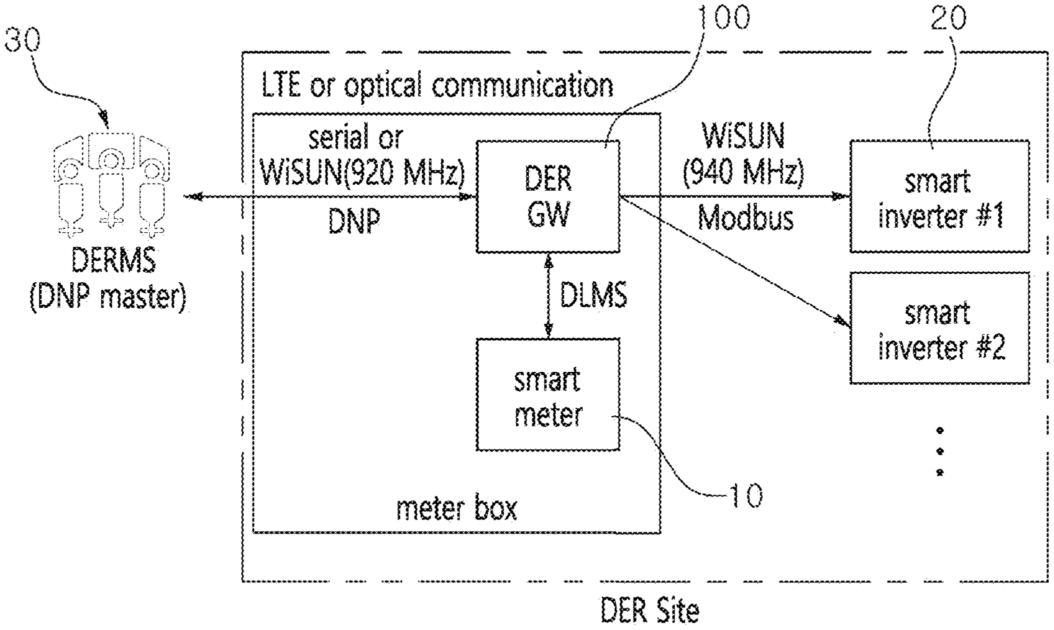
FIG. 3 is a diagram illustrating the verification of the validity of measurement/metering information of a smart inverter using a smart meter.

As shown in FIG. 3, the smart meter 10 (smartmeter) is installed for the purpose of advanced metering infrastructure (AMI), enabling bidirectional communication to measure time-of-use electricity and transmit data, facilitating bidirectional metering functionality for billing and settlement purposes within the customer premises.

The measurement/metering information validity verification unit 120 may verify the validity of the measurement/metering information from the smart inverter 20 using the smart meter 10 without the need for additional cost to establish additional comparison measurement equipment.

Firstly, the measurement/metering information validity verification unit 120 periodically collects measurement/metering information from the smart meter 10 installed in the meter box via serial communication or wireless smart ubiquitous network (WiSUN) (920 MHz) communication, based on the device language message specification (DLMS) protocol.

Next, the measurement/metering information validity verification unit 120 collects measurement/metering information from at least one smart inverter 20 using Wi-SUN (940 MHz) communication and the Modbus protocol.

The measurement/metering information validity verification unit 120 may verify the validity (precision or accuracy) of the measurement/metering information by periodically collecting data from both the smart meter 10 and the smart inverter 20 in this manner and comparing the data with each other.

Meanwhile, the DER GW 100 may also transmit output control commands, as instructed by the upper-level operating system 30, to the smart inverter 20.

Figure 4:
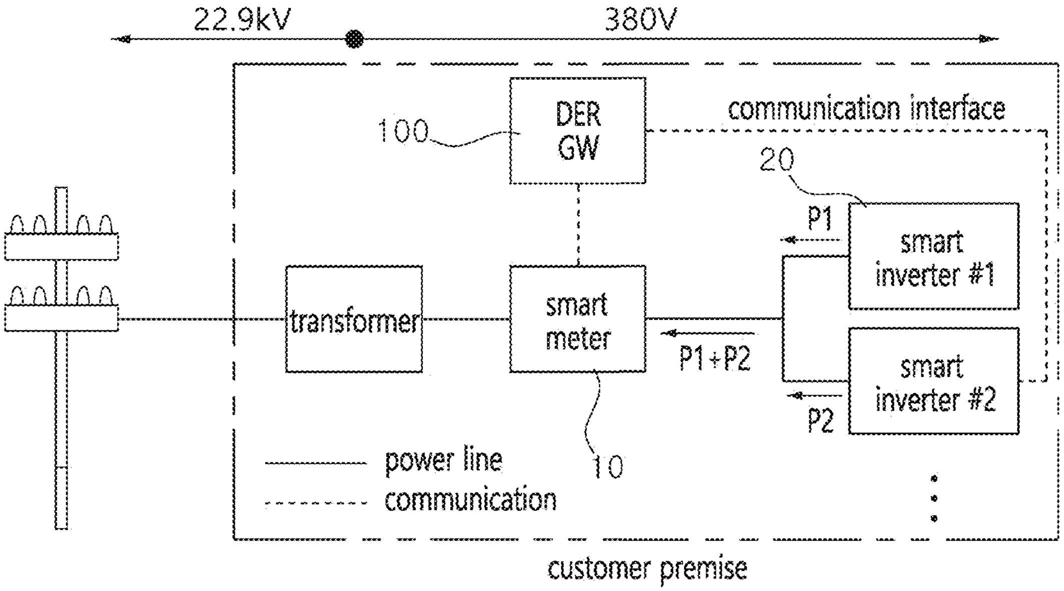
FIG. 4 is a diagram illustrating the electrical and communication interfaces for the mutual comparison of measurement/metering information in FIG. 3.

FIG. 4 is a diagram illustrating the electrical and communication interfaces for the mutual comparison of measurement/metering information in FIG. 3.

With reference to FIG. 4, since the smart meter 10 and the smart inverter 20 are typically located in close proximity (within a few meters) to each other, the impedance is low, and thus voltage drop can be considered negligible.

Accordingly, the voltage comparison between the smart meter 10 and the smart inverter 20 only needs to consider the voltage measurement accuracy (precision) provided by each device.

Due to the possibility of multiple smart inverters 20 being installed, the power output of each inverter needs to be measured independently and then summed together for use. In the embodiment of FIG. 4, for smart inverters #1 and #2, the voltage of the smart inverter 20 is the sum of the voltages P1 and P2 of smart inverters #1 and #2, i.e., P1+P2.

1) Smart Inverter Measurement Information Validity Verification

Figure 5:
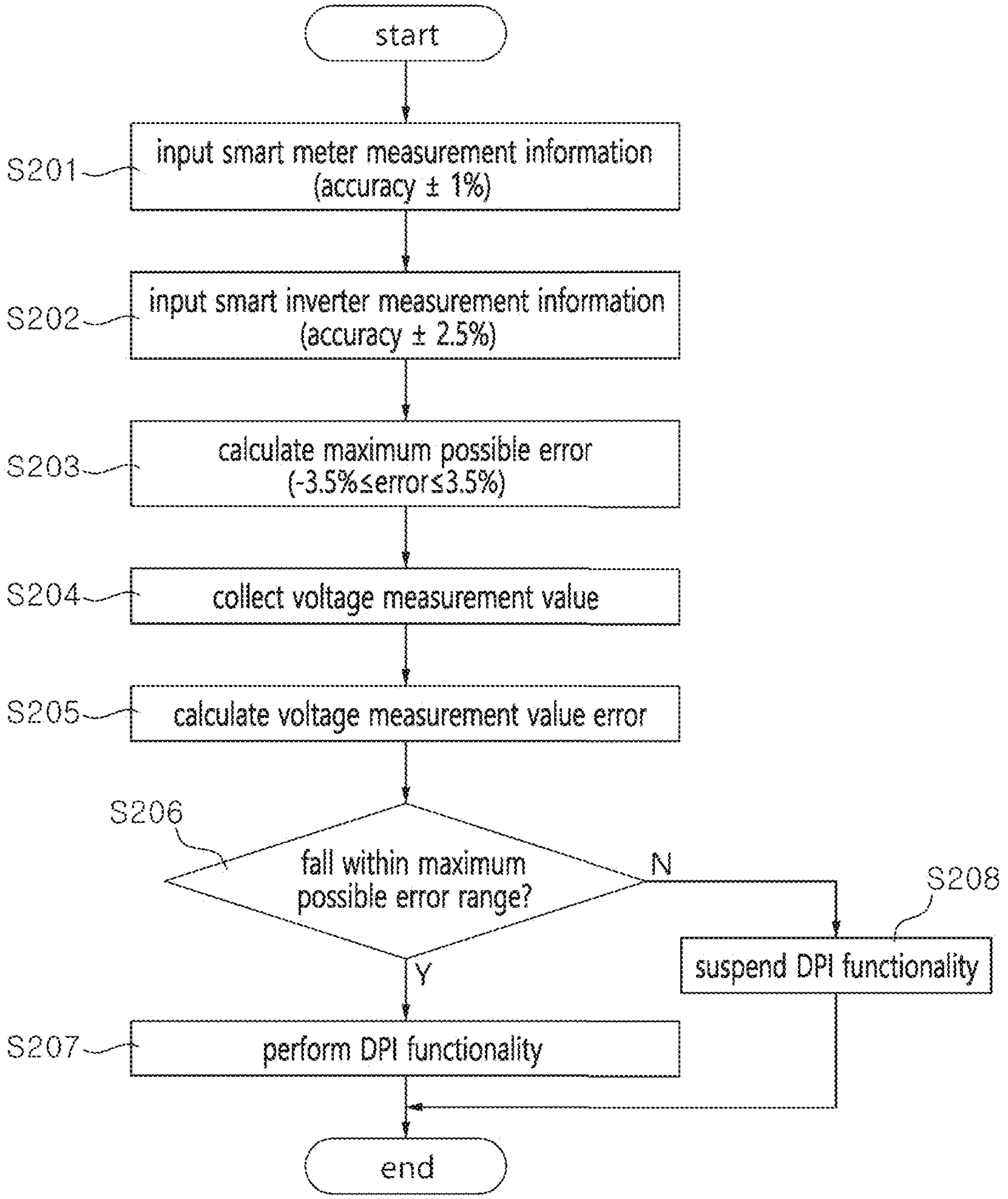
FIG. 5 is a diagram illustrating the method for verifying the validity (or accuracy) of measurement information of a smart inverter according to an embodiment of the present invention.

FIG. 5 is a diagram illustrating the method for verifying the validity (or accuracy) of measurement information of a smart inverter according to an embodiment of the present invention.

Here, the explanation is provided using voltage measurement values as measurement information, assuming that there is no voltage drop due to the short distance between the smart meter 10 and the smart inverter 20, as shown in FIG. 4.

As shown in FIG. 5, the DER GW 100 receives, at steps S201 and S202, input of the measurement accuracy of the smart meter 10 and the smart inverter 20 to verify the measurement information validity (or accuracy) of the smart inverter. Here, the explanation is provided using a measurement accuracy level of ±1% for the smart meter 10, classified as a statutory meter of class 1.0, and an accuracy level of ±2.5% for the smart inverter 20, typically required to have an accuracy level of ±2.5%.

At step S204, the DER GW 100 calculates the maximum possible error of the measurement accuracy using the measurement accuracies of the smart meter 10 and the smart inverter 20. That is, the DER GW 100 calculates the maximum possible error as '−[absolute value (maximum error of smart inverter)+absolute value (maximum error of smart meter)]=maximum possible error=[absolute value (maximum error of smart inverter)+absolute value (maximum error of smart meter)]. According to the aforementioned measurement accuracies, the maximum possible error is calculated as −3.5%≤maximum possible error≤3.5%.

Afterwards, the DER GW 100 periodically collects voltage measurement values from both the smart meter 10 and the smart inverter 20 at step S204. The DER GW 100 performs collection at the closest possible time to collect time-synchronized information without delay.

Next, the DER GW 100 calculates the voltage measurement value error between the smart meter 10 and the smart inverter 20 based on the smart meter 10 at step S205. In this case, the DER GW 100 takes the smart meter 10 as the reference for calculating the voltage measurement value error, as the statutory metering device, the smart meter 10, is more accurate than the smart inverter 20.

At step S206, the DER GW 100 compares the calculated voltage measurement error with the maximum possible range calculated at step S203. In this case, the DER GW 10 proceeds to execute the DPI functionality at step S207 based on the calculated voltage measurement error falling within the maximum possible error range, and suspends the DPI functionality at step S208 based on the calculated voltage measurement error falling out of the maximum possible error range.

2) Smart Inverter Metering Information Validity Verification

Figure 6:
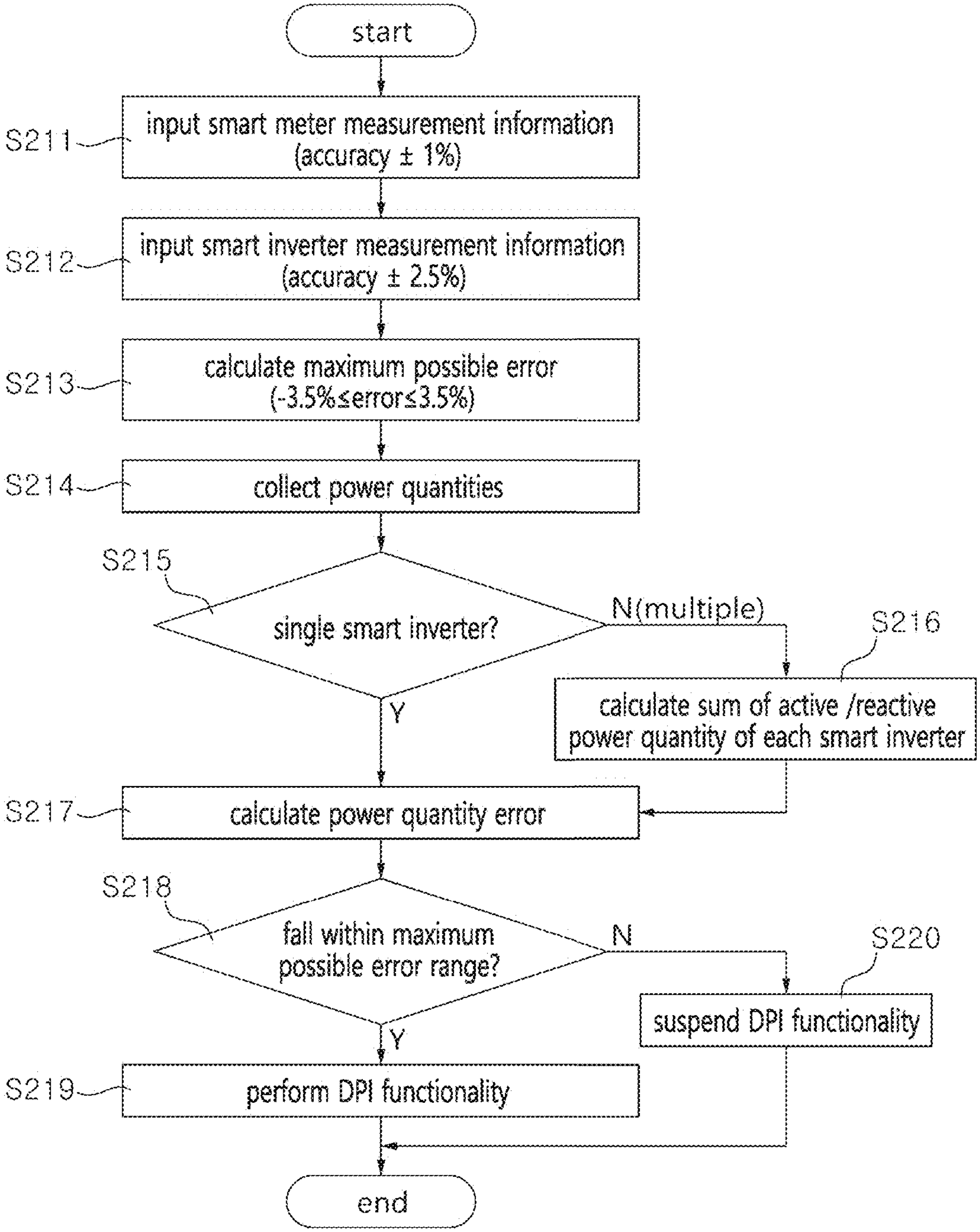
FIG. 6 is a flowchart illustrating for verifying the validity (or accuracy) of metering information of a smart inverter according to an embodiment of the present invention.

FIG. 6 is a flowchart illustrating for verifying the validity (or accuracy) of metering information of a smart inverter according to an embodiment of the present invention. Here, the metering information is explained using the example of electric power quantity, which encompass active power quantity and reactive power quantity. In particular, when multiple smart inverters 20 exist as illustrated in FIG. 4, it is necessary to aggregate the power quantities output by each smart inverter 20 for comparison.

As shown in FIG. 6, similar to FIG. 5, the DER GW 100 receives, at steps S211 and S212, input of the metering accuracy of the smart meter 10 and the smart inverter 20 to verify the metering information validity (or accuracy) of the smart inverter. Here, the explanation is provided using a metering accuracy level of ±1% for the smart meter 10. classified as a statutory meter of class 1.0, and an accuracy level of ±2.5% for the smart inverter 20, typically required to have an accuracy level of ±2.5%.

At step S213, the DER GW 100 calculates the maximum possible error of the metering accuracy using the metering accuracies of the smart meter 10 and the smart inverter 20. That is, the DER GW 100 calculates the maximum possible error as '−[absolute value (maximum error of smart inverter)+absolute value (maximum error of smart meter)] =maximum possible error=[absolute value (maximum error of smart inverter)+absolute value (maximum error of smart meter)]. According to the aforementioned measurement accuracies, the maximum possible error is calculated as −3.5%≤maximum possible error≤3.5%.

Afterwards, the DER GW 100 periodically collects power quantities from both the smart meter 10 and the smart inverter 20 at step S214. The DER GW 100 performs collection at the closest possible time to collect time-synchronized information without delay. In this case, when multiple smart inverters 20 exist, the DER GW 100 calculates the total output power quantity (total active/reactive power quantity) of each smart inverter 20 at step S215 and S216.

Next, the DER GW 100 calculates the power quantity error between the smart meter 10 and the smart inverter 20 based on the smart meter 10 at step S217.

At step S218, the DER GW 100 compares the calculated voltage measurement error with the maximum possible range calculated at step S213. In this case, the DER GW 10 proceeds to execute the DPI functionality at step S219 based on the difference falling within the maximum possible error range, and suspends the DPI functionality at step S220 based on the difference falling out of the maximum possible error range.

2. Validity Verification Using Measurement/Metering Information of Smart Inverter Itself FIG. 7 is a flowchart illustrating the validity verification method using the measurement/metering information of the smart inverter itself according to an embodiment of the present invention.

Figure 7:
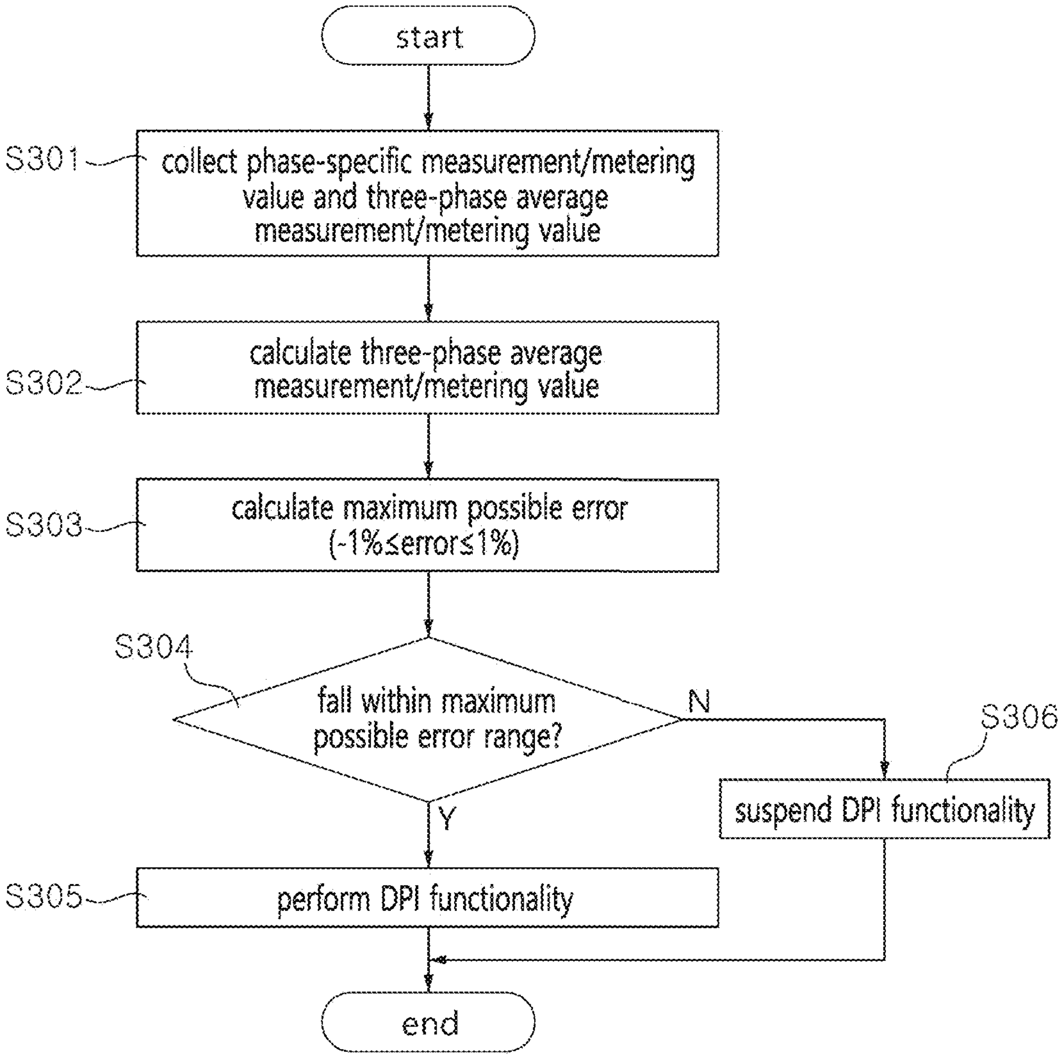
FIG. 7 is a flowchart illustrating the validity verification method using the measurement/metering information of the smart inverter itself according to an embodiment of the present invention.

As shown in FIG. 7, the DER GW 100 collects 3-phase average measurement/metering values and phase-specific measurement/metering values from the smart inverter 20, calculates the 3-phase average measurement/metering value using the collected phase-specific measurement/metering values, and determines tampering by comparing the collected and calculated 3-phase average measurement/metering values.

Even though a hacker gains root access to a smart inverter 20, it is not easy to tamper with all of the numerous measurement/metering items simultaneously. However, there is a significant likelihood that the most critical information, such as power quantity data, will be a top priority for tampering. Here, important measurement/metering items that DER GW 100 periodically collects from smart inverters 20 may include phase-specific voltage, phase-specific current, phase-specific active/reactive power, three-phase average voltage, three-phase average current, three-phase average active/reactive power, power factor, and frequency.

Firstly, the DER GW 110 collects phase-specific measurement/metering values and 3-phase average measurement/metering values from the smart inverter 20 at step S301. Here, the DER GW 110 may periodically collect and update measurement/metering values from the smart inverter 20 at intervals of seconds. The smart inverter 20 responds to a single request command with various items and is synchronized at intervals of less than a second for this purpose.

Next, the DER GW 110 calculates the three-phase average measurement/metering value using the collected phase-specific measurement/metering values at step S302.

Afterwards, the DER GW 110 compares the collected three-phase average measurement/metering values with the calculated three-phase average measurement/metering values to verify whether the difference fall within the maximum possible error range at steps S303 and S304. In this case, the DER GW 10 proceeds to execute the DPI functionality at step S305 based on the difference falling within the maximum possible error range, and suspends the DPI functionality at step S306 based on the difference falling out of the maximum possible error range.

For example, considering measurement/metering values as voltage values, the three-phase average voltage value may be calculated using a simple formula for the collected phase-specific voltage values (V1, V2, and V3), such as (V1+V2+V3)/3. Accordingly, the DER GW 100 compares the three-phase average voltage values collected from the smart inverters 20 with the three-phase average voltage values calculated using the aforementioned formula, and performs DPI-based packet filtering based on the difference falling within the maximum possible error range.

Figure 8:
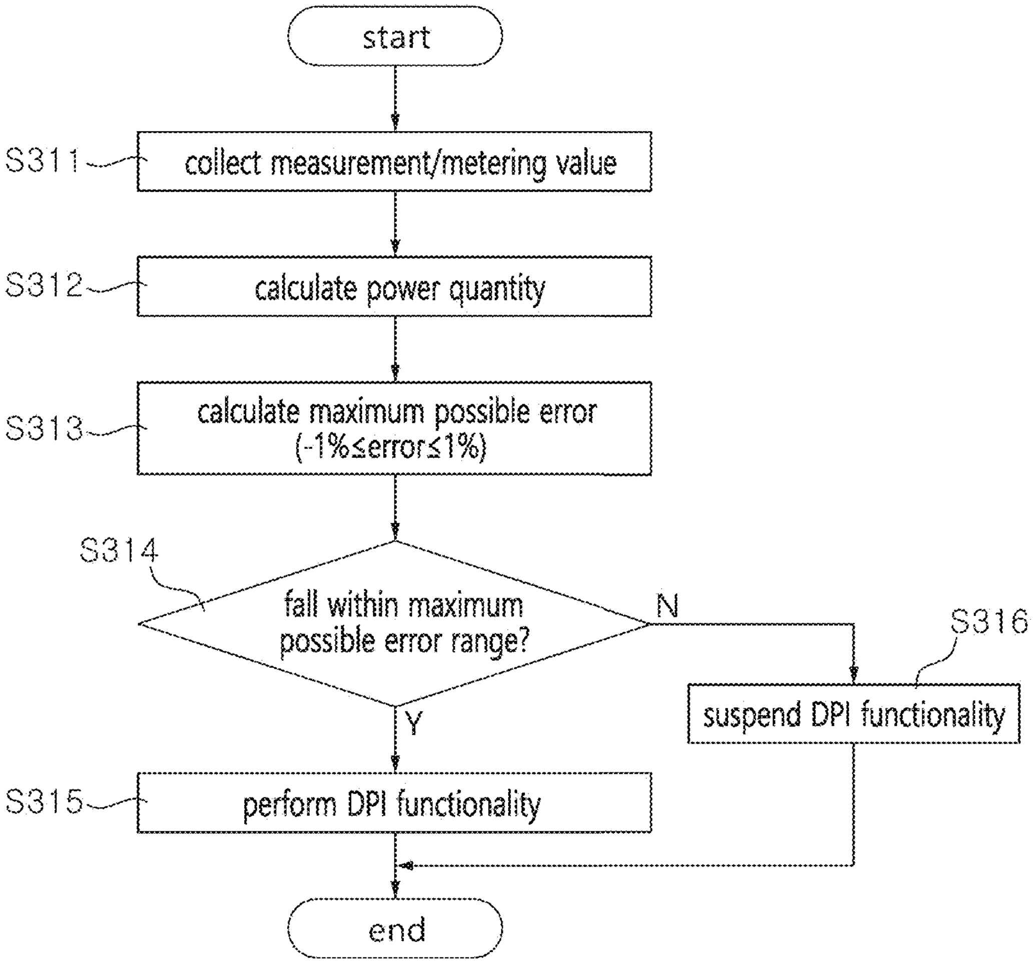
FIG. 8 is a flowchart illustrating the validity verification method using the measurement/metering information of the smart inverter itself according to another embodiment of the present invention.

FIG. 8 is a flowchart illustrating the validity verification method using the measurement/metering information of the smart inverter itself according to another embodiment of the present invention.

As shown in FIG. 8, the DER GW 100 collects measurement/metering values (current, voltage, power factor, active power, reactive power) from the smart inverters 20, calculates active power, reactive power, and apparent power using the collected values, and determines tampering by comparing at least one of the collected measurement/metering values with the calculated active power, reactive power, or apparent power.

Using the collected measurement/metering values, active power is calculated as 'voltage×current×power factor', reactive power is calculated as 'voltage×current×(1−power factor)', and apparent power is calculated as 'voltage×current'.

First, the DER GW 110 collects measurement/metering values from the smart inverter 20 at step S311. Next, the DER GW 110 calculates the power quantity using the collected measurement/metering values at step S312. Here, the power quantity is at least one of active power quantity, reactive power quantity, or apparent power quantity.

Afterwards, the DER GW 110 compares the collected measurement/metering values (power quantity) and the calculated power quantity at step S313 and determine at step S314 whether the difference falls within the maximum possible error range. In this case, the DER GW 100 proceeds to execute the DPI functionality at step S315 based on the difference falling within the maximum possible error range, and suspends the DPI functionality at step S316 based on the difference falling out of the maximum possible error range.

3. Validity Verification Using Embedded Metering IC of DER GW

Figure 9:
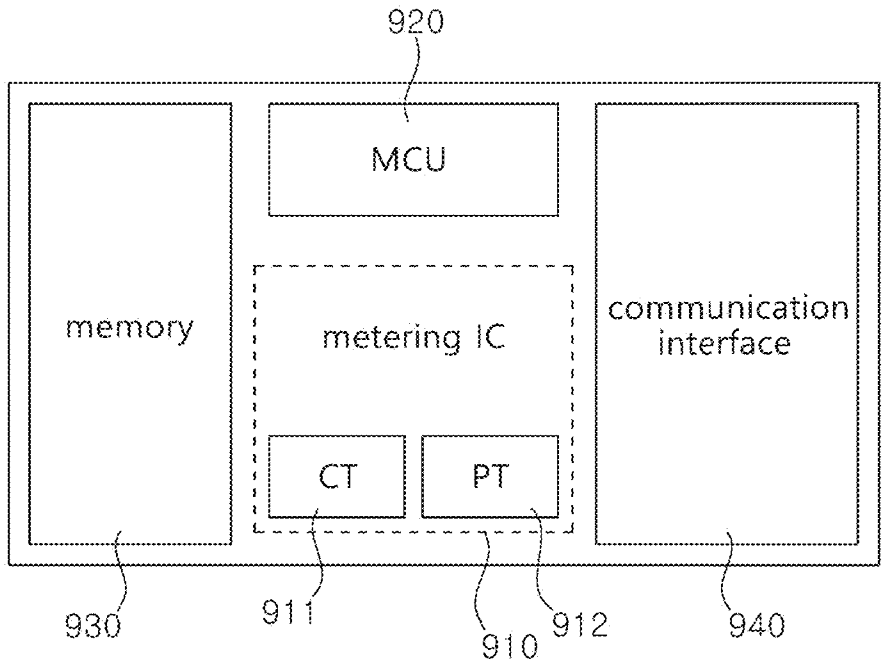
FIG. 9 is a diagram illustrating the metering IC embedded within the distributed energy resource gateway (DER GW) according to an embodiment of the present invention.

FIG. 9 is a diagram illustrating the metering IC embedded within the DER GW according to an embodiment of the present invention. With reference to FIG. 9, the metering integrated circuit (IC) 910 includes an analog front end (AFE) and computational capabilities, allowing generation of all measurement/metering information without additional circuitry configuration. In this case, the metering IC 910 may generate measurement/metering information with an accuracy of approximately within 1%.

Therefore, the microcontroller unit (MCU) 920 may easily utilize all the measurement/metering information generated at sub-second intervals. For this purpose, the metering IC must incorporate analog circuits such as current transformer (CT) 911, potential transformer (IPT) 912, which serve as current and voltage sensors, respectively. The MCU 920 may be configured to include a processor and a microcontroller.

Using the embedded metering IC to generate measurement/metering information offers the advantage of minimizing communication delays and enabling real-time collection compared to collecting information from smart inverters (as described with reference to FIGS. 7 and 8), and ensures accuracy of the measurement/metering information to the level of the smart meter 10, allowing the information to be used as reference information instead of the measurement/metering information of the smart meter 10 as described with reference to FIGS. 5 and 6.

That is, enables the verification process using measurement/metering information generated through the metering IC instead of relying on the data collected through the communication interface 940 from the smart meter 10, as described in FIGS. 5 and 6. The communication interface 940 may be composed of hardware components such as plugs, connectors, connection ports, and cards, enabling hardware components to establish connections and exchange information.

Meanwhile, the DER GW 100 includes memory 930 for storing at least one or more processes and computer-readable instructions. The DER GW 100 may perform validity verification of measurement/metering information for DPI-based packet filtering when at least one processor executes computer-readable instructions stored in the memory 930.

The memory 930 may be integrated within the MCU 920 or a separate memory component. The mentioned memory may be composed of a combination of non-volatile memory such as flash memory disks (solid state disk (SSD)), hard disk drives, flash memory, electrically erasable programmable read-only memory (EEPROM), static random access memory (SRAM), ferro-electric random access memory (FRAM), phase-change random access memory (PRAM), and magnetic random access memory (MRAM), and volatile memory such as dynamic random access memory (DRAM), synchronous dynamic random access memory (SDRAM), and double data rate-SDRAM (DDR-SDRAM).

The method according to some embodiments may be implemented in the form of program instructions that can be executed by various computing means and recorded on computer-readable media. The computer-readable media may store program instructions, data files, data structures, or a combination thereof. The program instructions recorded on the media may be specifically designed and configured for the present invention or may be publicly known and available for use by computer software professionals. Examples of computer-readable recording media include magnetic media such as hard disks, floppy disks, and magnetic tapes, optical media such as CD-ROMs and DVDs, magneto-optical media such as floptical disks, and hardware devices specially configured to store and execute program instructions, such as ROMs, RAMs, and flash memory. Examples of program instructions include machine code generated by compilers as well as high-level language code that can be executed by a computer using interpreters and similar tools.

While the above description focuses on the novel features of the present invention applicable to various embodiments, those skilled in the art will understand that various deletions, substitutions, and modifications may be made in the form and details of the devices and methods described above without departing from the scope of the present invention. Therefore, the scope of the present invention is defined by the appended claims rather than the foregoing description. Any modifications within the scope of equivalence of the patent claims are considered to be encompassed within the scope of the invention.

The invention claimed is:

1. A method for verifying validity of measurement/metering information for DPI-based packet filtering, the method comprising:

- collecting, at a distributed energy resource gateway, first measurement/metering information from a smart meter or embedded metering integrated circuit (IC) and second measurement/metering information from a smart inverter;
- calculating, at the distributed energy resource gateway, the error between the first measurement/metering information and the second measurement/metering information based on the first measurement/metering information;
- determining, at the distributed energy resource gateway, whether the error falls within a maximum possible error range; and
- performing, at the distributed energy resource gateway, deep packet inspection (DPI) functionality according to the determination result.

2. The method of claim 1, further comprising calculating, before the collecting, the maximum possible error range using the measurement accuracy of the smart meter and the measurement accuracy of the smart inverter.

3. The method of claim 1, wherein the performing of DPI functionality comprises executing the DPI functionality based on the calculated error falling within the maximum possible error range and suspending the DPI functionality based on the calculated error falling out of the maximum possible error range.

4. The method of claim 1, wherein the collecting comprises calculating, when there are multiple smart inverters, the sum of the second measurement/metering information.

5. The method of claim 1, wherein the metering IC incorporates an analog circuit of a current transformer (CT)/potential transformer (PT) serving as a current and voltage sensor.

6. A method for verifying validity of measurement/metering information for DPI-based packet filtering, the method comprising:

collecting first and second measurement/metering information included in measurement/metering items from a smart inverter;

calculating third measurement/metering information corresponding to the second measurement/metering information using the first measurement/metering information;

comparing the second measurement/metering information and the third measurement/metering information;

determining whether the error falls within a maximum possible error range; and performing deep packet inspection (DPI) functionality based on the determination result.

7. The method of claim 6, wherein the first measurement/metering information is phase-specific measurement/metering value, and the second measurement/metering information and the third measurement/metering information are three-phase average measurement/metering values.

8. The method of claim 6, wherein the first measurement/metering information comprises current, voltage, and power factor, and the second measurement/metering information and the third measurement/metering information comprises active power quantity, reactive power quantity, and apparent power quantity.

9. A distributed energy resource gateway (DER GW) comprising:

at least one processor; and a memory configured to store computer-readable instructions, wherein the instructions are executed by the at least one processor for the distributed energy resource gateway to collect first measurement/metering information from a smart meter or embedded metering integrated circuit (IC) and second measurement/metering information from a smart inverter, calculate the error between the first measurement/metering information and the second measurement/metering information based on the first measurement/metering information, determine whether the calculated error falls within a maximum possible error range, and perform deep packet inspection (DPI) functionality according to the determination result.

10. The distributed energy resource gateway of claim 9, wherein the instructions are executed by the at least one processor for the distributed energy resource gateway to calculate, before collecting the first measurement/metering information and the second measurement/metering information, the maximum possible error range using the measurement accuracy of the smart meter and the measurement accuracy of the smart inverter.

11. The distributed energy resource gateway of claim 9, wherein the instructions are executed by the at least one processor for the distributed energy resource gateway to execute the DPI functionality based on the calculated error falling within the maximum possible error range and suspend the DPI functionality based on the calculated error falling out of the maximum possible error range.

12. The distributed energy resource gateway of claim 9, wherein the instructions are executed by the at least one processor for the distributed energy resource gateway to calculate, when there are multiple smart inverters, the sum of the second measurement/metering information.

13. The distributed energy resource gateway of claim 9, wherein the metering IC incorporates an analog circuit of a current transformer (CT)/potential transformer (PT) serving as a current and voltage sensor.

14. The distributed energy resource gateway of claim 9, further comprising:

a packet structure analysis unit configured to analyze a packet format of the measurement/metering information collected by the smart inverter;

a measurement/metering information validity verification unit configured to verifying validity of the measurement/metering information; and a simple ruleset definition and filtering unit and a correlation ruleset definition and filtering unit configured to analyze correlation between transmitted and received packets for validity verification of DPI-based packet filtering, wherein the measurement/metering information validity verification unit performs one of a method of verifying the validity of the measurement/metering information collected from the smart inverter using the smart meter installed near the smart inverter, a method of verifying the validity of the measurement/metering information collected from the smart inverter by analyzing and comparing various measurement items of the smart inverter, and a method of verifying the validity of the measurement/metering information collected from the smart inverter by internally generating measurement/metering information using the metering IC and comparing the generated information with the measurement/metering information collected from the smart inverter.

* * * * *